United States Patent [19]

Sturrus et al.

[11] Patent Number: 5,306,058
[45] Date of Patent: Apr. 26, 1994

[54] TUBULAR ROLL-FORMED AUTOMOTIVE BUMPER

[75] Inventors: Peter Sturrus; Richard Heinz, both of Grand Haven, Mich.

[73] Assignee: Shape Corporation, Grand Haven, Mich.

[21] Appl. No.: 499,100

[22] Filed: Mar. 26, 1990

[51] Int. Cl.$^5$ ............................................. B60R 19/24
[52] U.S. Cl. .................................. 293/154; 293/122; 138/DIG. 11
[58] Field of Search ............... 293/102, 120, 121, 122, 293/154, 155; 138/171, 173, DIG. 11; 52/731, 731.2, 731.6; 296/146, 188, 146 C, 146.6

[56] References Cited

U.S. PATENT DOCUMENTS

| | | | |
|---|---|---|---|
| D. 134,943 | 2/1943 | Mitchell | 293/102 X |
| 1,317,112 | 9/1919 | Wasson | 293/102 |
| 1,424,359 | 8/1922 | Isgrig | 293/102 |
| 1,611,156 | 12/1926 | Borresen | 293/121 X |
| 1,649,922 | 11/1927 | Paull | 219/83 |
| 1,663,424 | 3/1928 | Taylor | 293/102 |
| 1,829,638 | 10/1931 | Egler | 138/171 |
| 1,956,604 | 5/1934 | Williams | 72/206 |
| 1,966,453 | 7/1934 | Lyon | 293/102 X |
| 2,077,454 | 4/1937 | Almdale | 138/171 |
| 2,817,364 | 12/1957 | Crawford | 138/171 |
| 2,880,013 | 3/1959 | Dean | 280/798 |
| 3,209,432 | 10/1965 | Cape | 29/897.2 |
| 3,212,941 | 10/1965 | O'Brien | 293/102 X |
| 3,843,182 | 10/1974 | Walls et al. | 293/122 |
| 3,879,073 | 4/1975 | Norlin | 293/102 X |
| 3,905,630 | 9/1975 | Cantrell | 293/102 |
| 4,010,969 | 3/1977 | Cantrell et al. | 293/102 |
| 4,069,638 | 1/1978 | Hasselqvist et al. | 52/731 X |
| 4,116,480 | 9/1978 | Crestetto | 293/102 |
| 4,160,562 | 7/1979 | Crestetto | 293/120 |
| 4,326,398 | 4/1982 | Bégué | 72/193 |
| 4,481,803 | 11/1984 | Dieser | 72/150 |
| 4,530,226 | 7/1985 | Granzow et al. | 72/171 |
| 4,563,028 | 1/1986 | Ogawa et al. | 293/122 |
| 4,599,843 | 7/1986 | Ingvarsson | 52/731 |
| 4,714,287 | 12/1987 | Merkle | 293/102 |
| 4,744,233 | 5/1988 | Trudell | 72/150 |
| 4,961,603 | 10/1990 | Carpenter | 293/102 |
| 5,080,410 | 1/1992 | Stewart et al. | 293/102 |

FOREIGN PATENT DOCUMENTS

| | | |
|---|---|---|
| 1237453 | 3/1967 | Fed. Rep. of Germany . |
| 218453 | 12/1983 | Japan . |
| 92232 | 5/1984 | Japan ................................. 293/102 |
| 0597455 | 2/1978 | U.S.S.R. ............................. 72/168 |
| 1497438 | 1/1978 | United Kingdom ............... 293/120 |

OTHER PUBLICATIONS

Golze, R. R. et al., "Bumper Design, Materials, and Fabrication", *Society of Automotive Engineers*, Paper No. 730030, Jan. 1973, pp. 1–8.

*Primary Examiner*—David M. Mitchell
*Assistant Examiner*—Andrew C. Pike
*Attorney, Agent, or Firm*—Price, Heneveld, Cooper, DeWitt & Litton

[57] ABSTRACT

A bumper bar for vehicles formed from rolled sheet steel having a closed tubular profile designed to have a high impact resistance, high strength-to-weight ratio, and a low cost of manufacture. The bar is preferably swept along its longitudinal axis to create a curvature consistent with modern automotive designs.

1 Claim, 5 Drawing Sheets

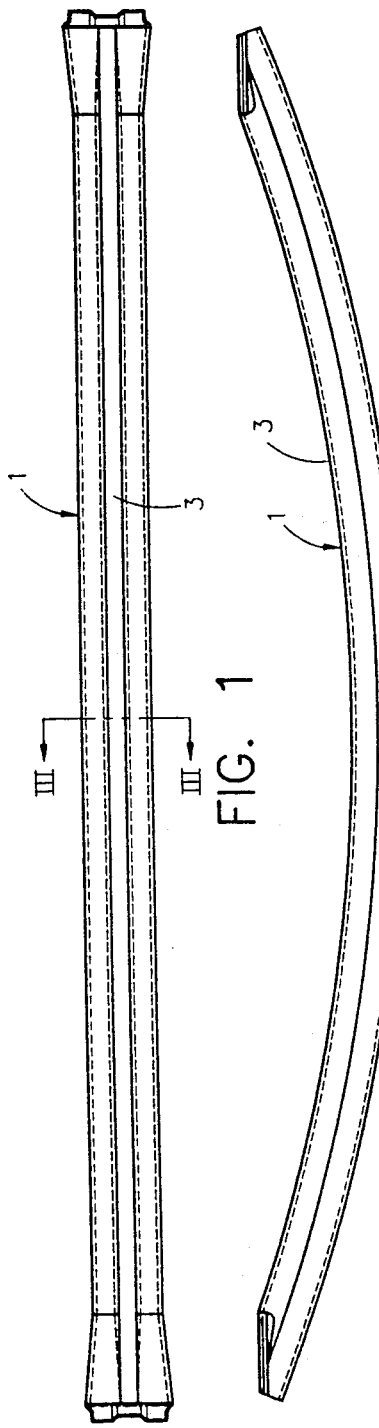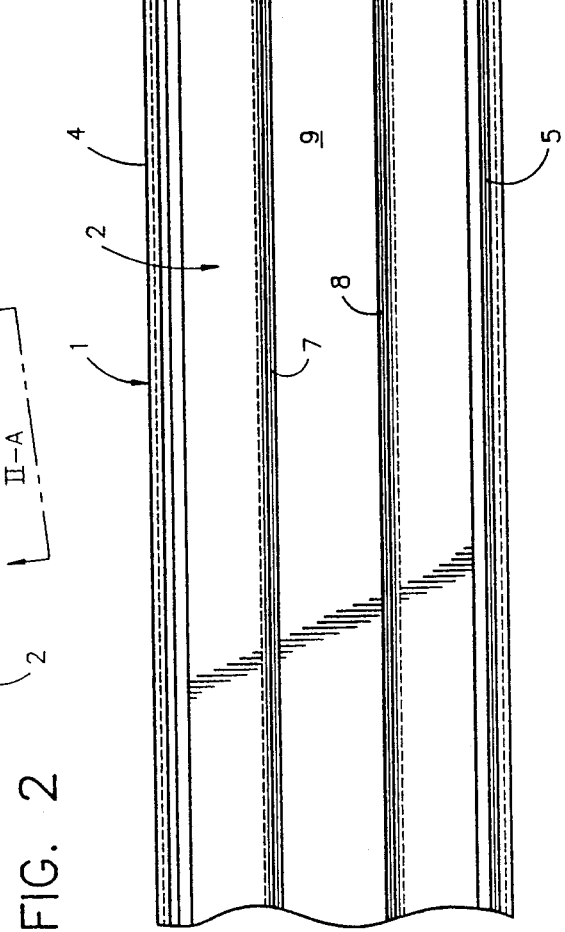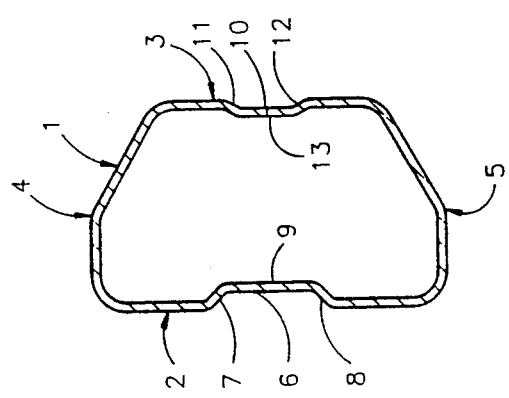

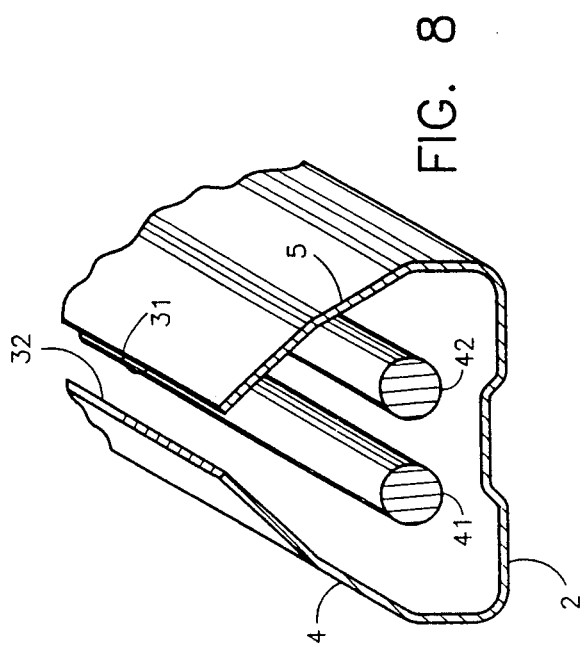
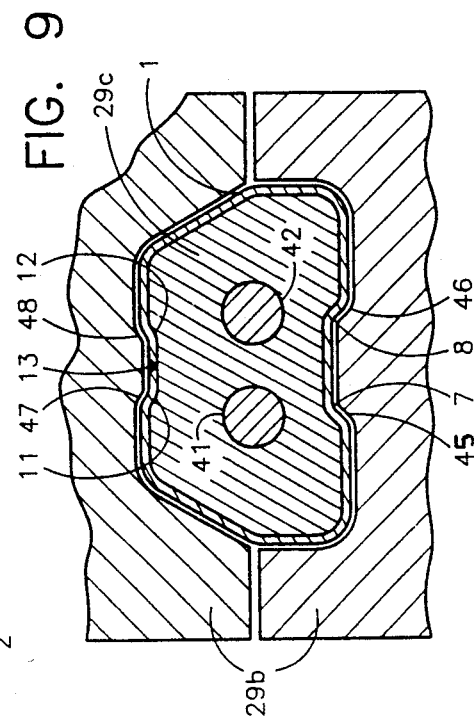
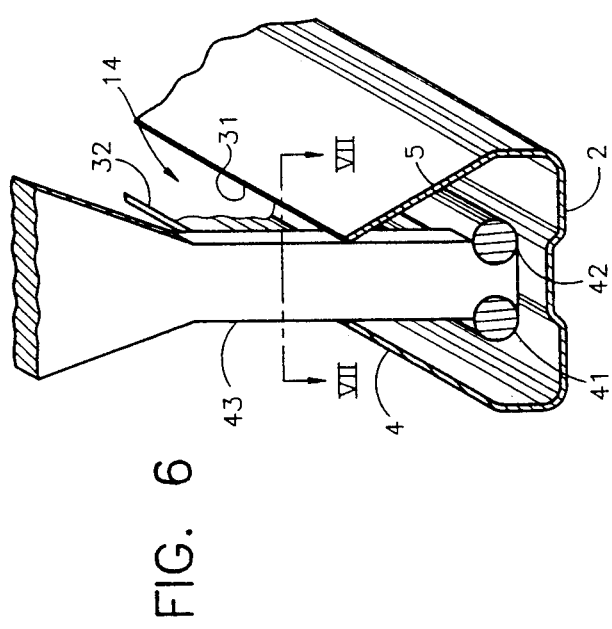
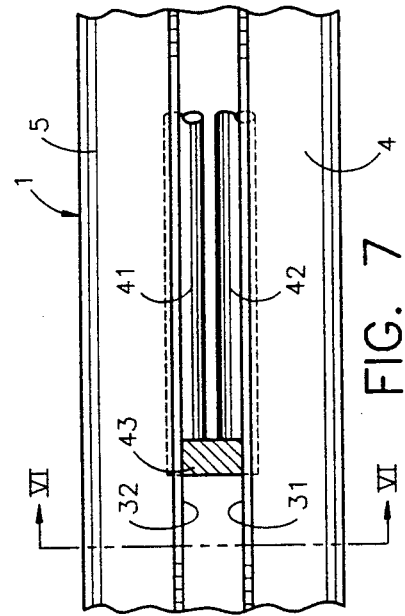

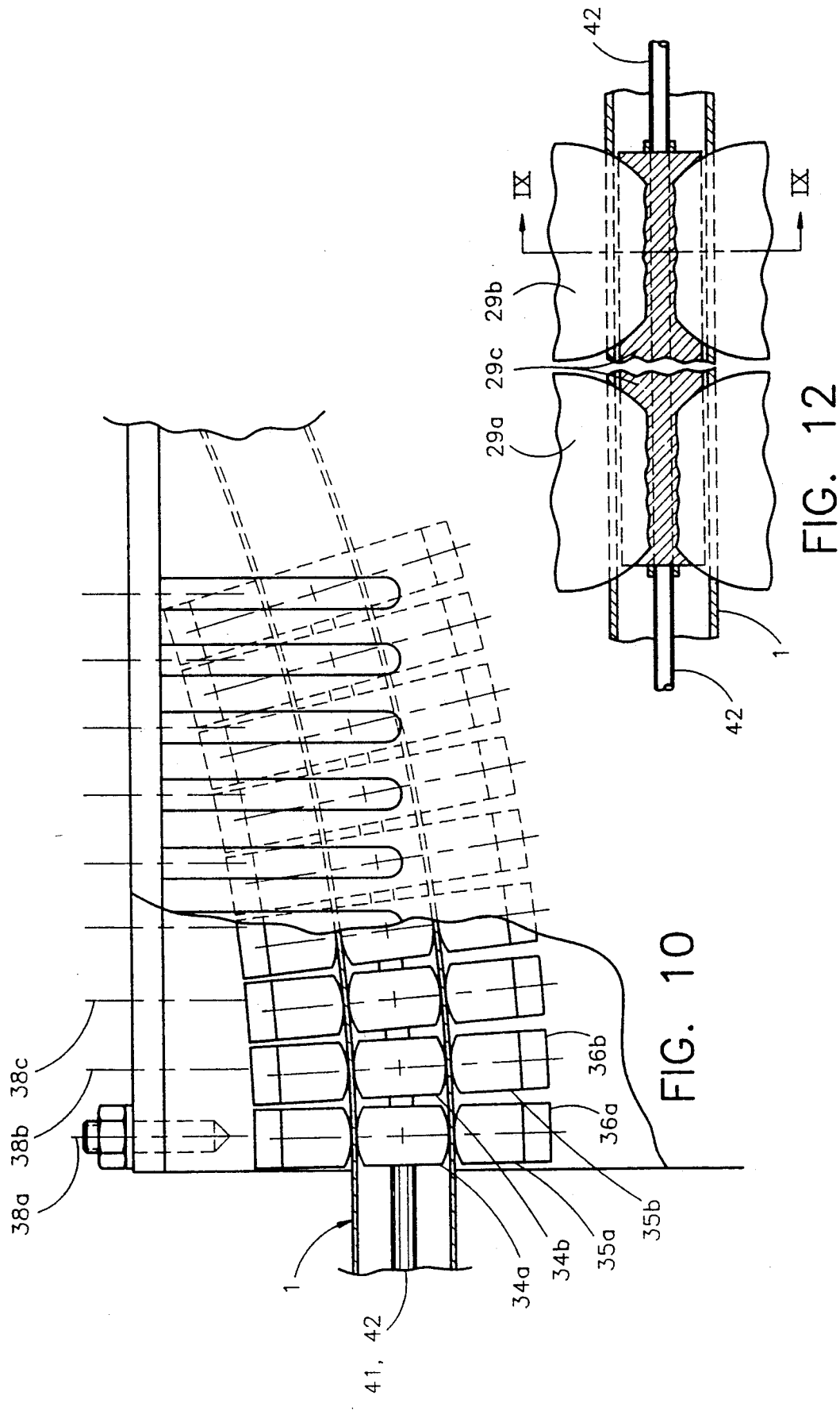

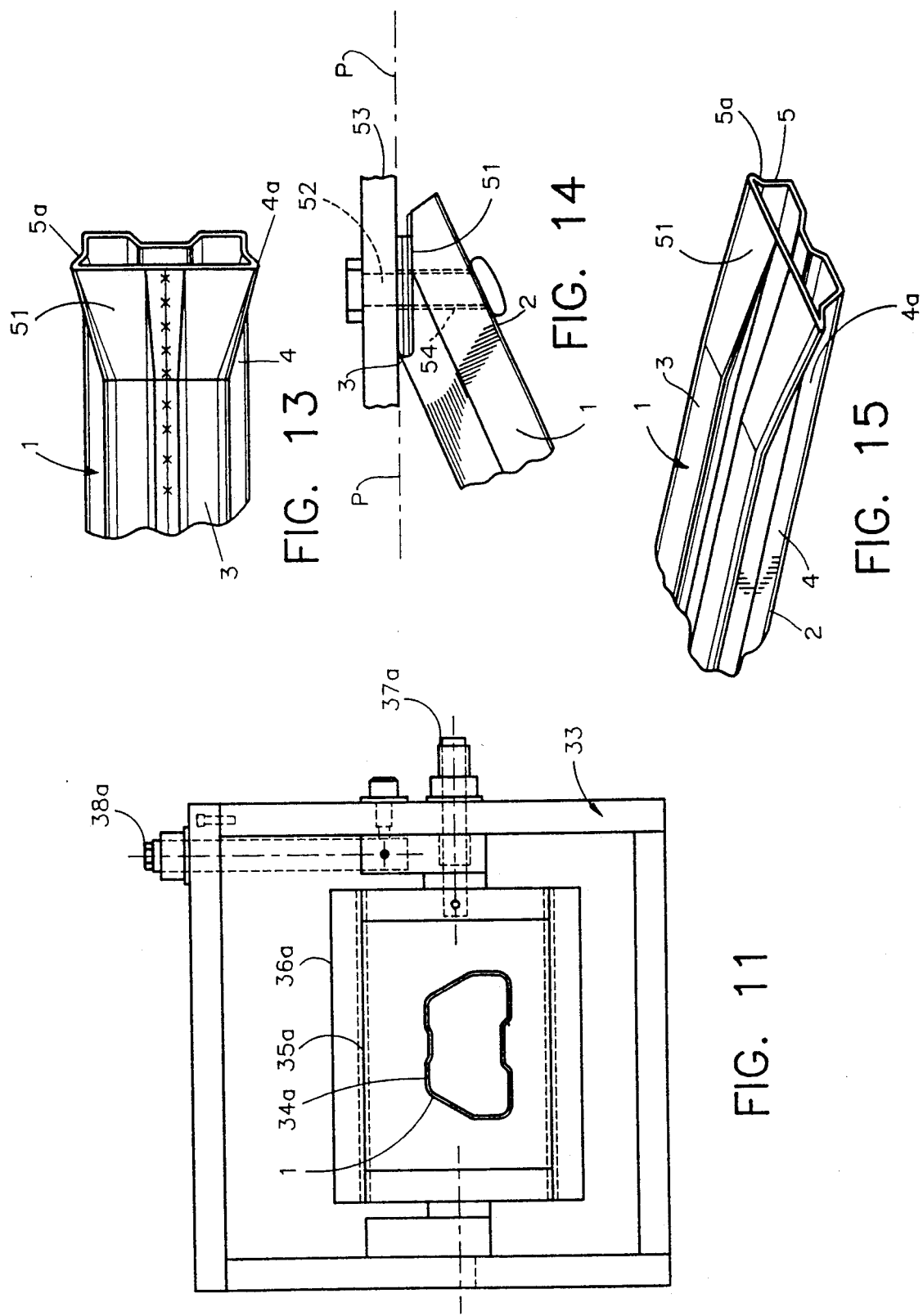

TUBULAR ROLL-FORMED AUTOMOTIVE BUMPER

AREA OF INVENTION

This invention relates to automotive bumper bars, and more specifically a roll-formed tubular bumper made of high strength sheet steel of less than .100 inch thickness with a high impact resistance, low weight, and relatively low cost of manufacture.

BACKGROUND OF THE INVENTION

Automotive bumpers are subject to a variety of design requirements due to consumer demands, government regulation, and the competitiveness of the industry. Bumpers must maintain a high level of strength and damage resistance to meet consumer expectation and government regulation concerning low speed vehicular impact. However, a bumper must also be of low weight to minimize vehicular dead weight which reduces gas mileage and increases suspension requirements. Also, bumpers must have a low manufacturing cost and high dimensional consistency given the competitiveness of the industry. Thus, high strength-to-weight ratios and ease of manufacture are critical to the success of present bumper systems.

These requirements are further complicated by the present aerodynamic design trends which call for a high degree of sweep across the front of automobiles, such sweep also contributing to the strength of the bumper and its spring-back characteristics.

A variety of designs and methods have been tried to improve bumpers. Many have used new metallic materials (such as aluminum o heat treatable steel alloys) and engineering resins (such as urethanes and elastomers) with varying degrees of success. However, many of these new materials suffer from availability and cost problems as well as special processing problems. In addition, where combinations of materials are used, assembly time is increased. Further, the automotive industry continues to demand even higher strength-to-weight ratios.

A conventional bumper has a C-shape formed of relatively low strength and thick steel. Many of such C-shaped bumpers are roll-formed and some are formed with a sweep at the end of the roll-forming operation by passing them over mandrels.

A problem of the traditional, predominant, "C" section bumper is the sudden collapse experienced during deflection when the horizontal flanges give way. The sudden failure makes it more difficult to properly trigger the inflation of air bags which are intended to cushion passengers from secondary impacts during a vehicle crash.

Lastly, bumper attachment methods have become more critical as bumper strengths increase. Forces of impact are larger and transferred more directly.

Thus, it is an intention of this invention to greatly improve strength and reduce weight over present bumper systems while utilizing available materials in a reliable and cost-efficient process of manufacture.

It is a further intention of this invention to provide a bumper which provides its strength and impact resistance over an extended deflection cycle without experiencing the sudden failure experienced by the prevalent traditional "C" section bumpers.

It is also an intention of this invention to provide a method of manufacture allowing a high degree of sweep along the longitudinal length of the bumper, thus allowing for designs which meet the highly aerodynamic designs called for by modern trends and also producing a stronger bumper with improved spring-back characteristics.

It is also an intention of this invention to provide a unique attachment means which will meet the requirements of such a high strength bumper.

SUMMARY OF THE INVENTION

The present invention provides an automotive bumper bar and the method of making such bumper made of high strength steel and roll-formed into a tubular cross section. The bumper may be made from a variety of high strength steels of varying thickness and rolled into a variety of tubular cross-sectional shapes.

The invention solves the aforementioned problems by roll-forming a closed tubular cross section from high strength sheet steel of at least 60KSI and 0.100 inches maximum thickness. By forming a closed section, the strength of the bar is greatly increased. This allows weight reduction by use of a reduced material thickness. The closed design also improves deflection curves by avoiding the sudden collapse experienced by traditional "C" section bumpers as the flanges give way.

A narrower but important aspect of this invention is the formation of a sweep during the roll-forming process. This sweep allows for manufacture of a bumper which will satisfy modern aerodynamic designs and also increase the strength of the bumper and improve its spring-back characteristics.

A still narrower aspect of this invention allows for formation of an attachment surface capable of withstanding the force created by an impact upon the bumper.

BRIEF DESCRIPTION OF THE DRAWINGS

FIG. 1 is a front view of a roll-formed bumper of the invention;

FIG. 2 is a plan view of the roll-formed bumper of the invention with a sweep;

FIG. 2A is an enlarged portion of a center portion of the plan view of FIG. 2;

FIG. 3 is a cross-sectional view of the bumper in FIG. 2 and also shown in FIG. 4 taken along the plane III—III;

FIG. 6 is a perspective, cross-sectional view taken along the plane VI—VI of FIG. 4;

FIG. 7 is a cross-sectional view taken along the plane VII—VII of FIG. 6;

FIG. 8 is a perspective, cross-sectional view taken along the plane VIII—VIII of FIG. 4;

FIG. 9 is a cross-sectional view taken along the plane IX—IX of FIG. 4;

FIG. 10 is a cut-away, schematic view of a side of the sweeping means showing the sweeping mandrels and anchoring rod;;

FIG. 11 is a frontal view of the sweeping station disclosing the mandrels which form the curvature in the bumper;

FIG. 12 is a schematic of a section of the roll-form apparatus illustrating the position of a mandrel at the last two rollers;

FIG. 13 is a view of the back side of a modified end of the bumper;

FIG. 14 is a plan view of the modified end of the bumper illustrating the attachment of the same to a support on a vehicle; and FIG. 15 is a partial, perspective view of the end of the bumper as disclosed in FIGS. 13 and 14.

DESCRIPTION OF THE PREFERRED EMBODIMENT

Figure 4:
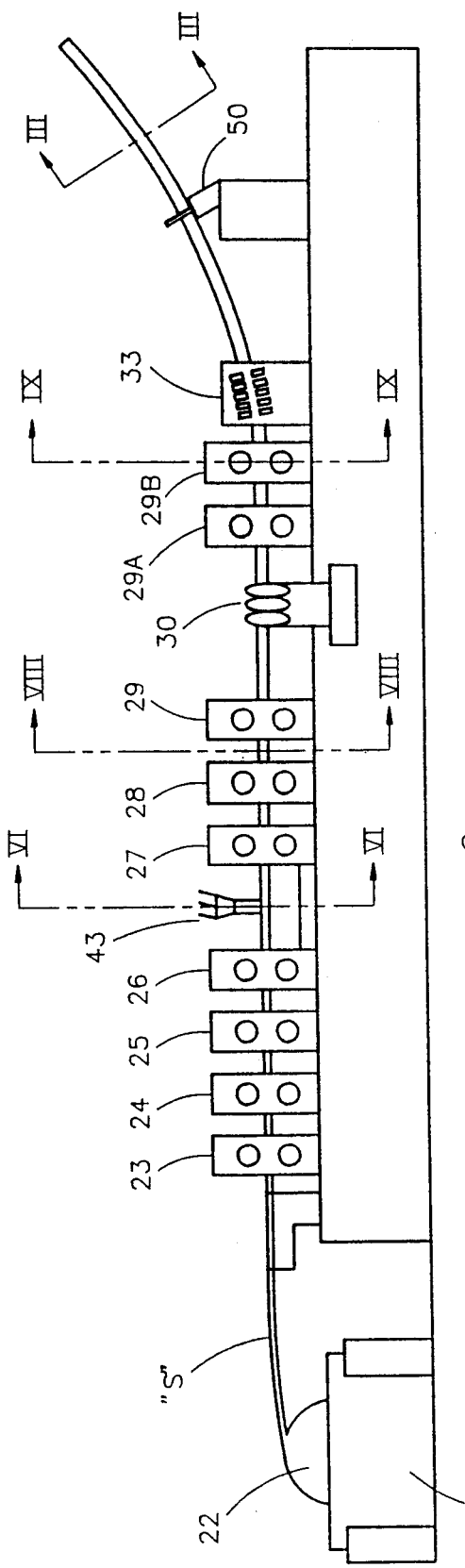
FIG. 4 is a schematic view of the roll form apparatus of this invention and for practicing the process of this invention.

The bumper bar of this invention is best disclosed in FIGS. 1, 2, 2A and 3, which discloses the bumper bar 1 having a front side 2, rear side 3, top side 4, and bottom side 5. Front side 2 includes an indentation 6 having an upper ledge 7, lower ledge 8, and central portion 9. Rear side 3 also includes indentation 10 composed of an upper edge 11 and lower edge 12. Indentations 6 and 10 are provided for two reasons. Indentations 6 and 10 contribute to and thus increase the strength of the bumper 1 and also provides the unique function of advancing or contributing to the movement of the bumper over the sweep forming mandrel as will be explained hereinafter. Bumper bar 1 is constructed of a sheet of high strength steel roll-formed to cause its edges to abut one another. The edges are permanently induction welded as disclosed by the welded seam 13. The bumper is roll-formed by apparatus schematically depicted in FIG. 4 using traditional components of a roll-forming apparatus 20 uniquely modified as will be disclosed hereinafter to produce an unusually high radius sweep as disclosed in FIG. 2.

Sweep, as used in the automotive industry, is the term utilized to describe the curvature of the bumper. Measurements of sweep may be derived from charts such as disclosed below which include the measurements of the distance from a vertical plane "P" located at the forwardmost point of the bumper and perpendicular to the longitudinal axis of the car to various points along the bumper as disclosed in FIG. 5.

| *SWEEP NUMBER | RA- DIUS | **A (30) | B (25) | C (20) | D (15) | E (10) | F (5) | C/L |
|---|---|---|---|---|---|---|---|---|
| 0 | 0 | 0 | 0 | 0 | 0 | 0 | 0 | 0 |
| 1 | 3600 | .125 | .087 | .056 | .031 | .014 | .004 | 0 |
| 5 | 720 | .625 | .434 | .278 | .156 | .070 | .017 | 0 |
| 10 | 360 | 1.250 | .868 | .555 | .312 | .139 | .035 | 0 |
| 20 | 181 | 2.500 | 1.733 | 1.107 | .622 | .276 | .069 | 0 |
| 40 | 92.50 | 5.000 | 3.443 | 2.188 | 1.224 | .542 | .135 | 0 |
| 60 | 63.75 | 7.500 | 5.107 | 3.219 | 1.790 | .789 | .196 | 0 |

Figure 5:
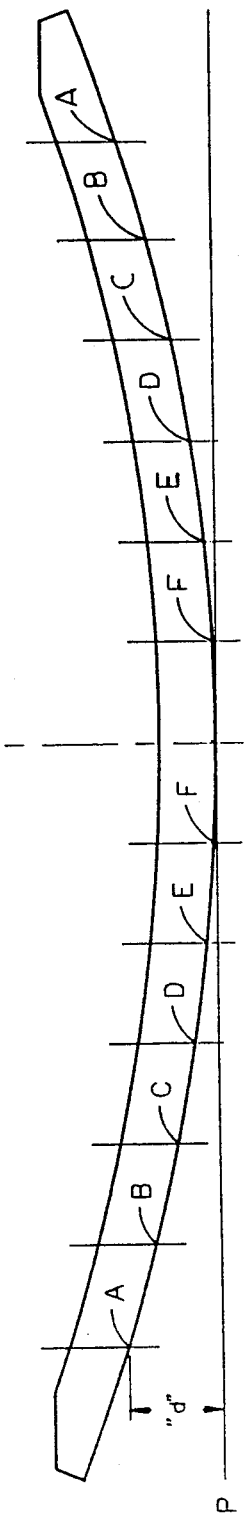
FIG. 5 is a sketch illustrating the method employed to measure sweep.

*All digits are in inches and are rounded to 3 digits unless otherwise noted.
**The letters indicate points located at 5.0" increments from the center line C/L as illustrated in FIG. 5. For example, point F is 5.0" from C/L, point E is 10.0" from C/L, point D is 15.0" from C/L, ... and point A is 30.0" from C/L.

Referring to the above chart and FIG. 5, the relative position of various points can easily be determined. For example, in a #5 sweep (i.e. a curvature having a 720" radius), point A which is 30.0" from longitudinal centerline (C/L) of the car is 0.625" (the distance "d") rearward of the front plant "P" of the bumper. Similarly, in a #60 sweep (i.e. curvature having a 63.75" radius), point A is 7.500" (the distance "d") rearward of the front plane "P" of the bumper. The sweep on present day bumpers has been extremely limited by the structural design of such bumpers and the methods and apparatus of manufacturing the same. As a result, the sweep generally has been below 30 sweep. Bumpers constructed in accordance with this invention have fallen within the range of 30-60 sweep which was unheard of in the automotive industry.

Although bumper bar 1 is formed from a sheet of high strength steel, the specific grade and type of high strength steel may vary within a range of parameters depending upon the specific application in question. This range includes two specific parameters which in accordance with narrow aspects of this invention are important to the invention; specifically, the tensile strength generally measured in units of KSI (thousand pounds of force per square inch) and thickness generally measured in the thousandths of an inch or in millimeters (mm). In accordance with the more narrow aspects of this invention, the KSI range presently available steel is from 60 to 120 although higher strength steels might be used as they may become available, it being understood therefore that the KSI range must be at least 60 KSI. The thickness range is from 0.048 to 0.100 inches, it also being understood that if higher strength steels above 120 KSI become available, the thickness may be even less than 0.048 inches. In any event, to obtain the maximum advantage of the invention, the thickness must be less than 100 inches.

Bumpers have been successfully formed by this invention from steel ordered pursuant to ASTM A606-85 and ASTM A715-87 designations more specifically discussed hereinafter. However, experience suggests that the materials need not be limited to these two materials. Use of even higher strength materials such as Martinsite (an ultra high strength material of 150-200 KSI) is contemplated. It should be noted that "ASTM" is a commonly recognized abbreviation for the American Society for Testing and Materials, and the suffix "85 " means that the standard was re-approved in 1985 by the ASTM committee having jurisdiction over this standard. Details on ASTM specifications and designations are available through the ASTM society, as is widely known in the industry. Therefore, only cursory information is included hereinafter.

"ASTM A606-85" is a ASTM designation calling for a high-strength, low alloy, rolled steel with improved atmospheric corrosion resistance and a tensile strength of up to approximately 70 KSI. The material is intended for structural use where savings in weight and added durability are important. Various "types" may be ordered such as "Type 4", for instance, which has four times the corrosion resistance of plain carbon steel. Various ordering information is required such as type of rolling (hot o cold rolled), dimensions (height, width, thickness), special requirement, and etc. The chemical composition is varied by the steel manufacturer to meet specific strength and formability requirements of the user.

"ASTM A715-87" is an ASTM designation calling for a high-strength, low alloy, rolled steel with improved formability over ASTM A606 materials. The steel is killed to form fine grain steel and includes various combinations of special micro-alloying elements such as columbium, titanium, vanadium, zirconium, and other elements. ASTM A715 offers improved formability as well as improved weldability, and may include tensile strengths of up to 90 KSI.

The inventor has also utilized AISI 050WK and AISI 120XF materials successfully. "AISI" is a commonly recognized abbreviation in the industry for the American Iron and Steel Institute. AISI specifications are typically cross-referenced to the most similar ASTM designation, but contain a slightly different classification scheme. For example, AISI 050WK refers to ASTM A606-85 with the "050" standing for minimum tensile yield strength (in KSI), the "W" for weatherability, and the "K" for the fact that the steel is killed. AISI 120XF has no ASTM reference at present, but is similar to ASTM A715-87 in that AISI 120XF has a high minimum yield strength (120 KSI minimum), is low alloy ("X"), and killed plus inclusion control ("F"). AISI 120XF may or may not be supplied as a G60 minimum spangle galvanized sheet.

As noted, within the above ranges the specific type and grade of high strength steel may vary depending on the application. The material thickness, chemical composition, and tensile strength all affect cross-sectional formability and the ability to form a sweep. The inventor has successfully formed steel having a 0.072" thickness and a tensile strength of 80–120 KSI to a #40 sweep from the above materials. Steel having a 0.072" thickness and a tensile strength of 80 KSI has successfully been formed to a #60 sweep. However, by experience, we have discovered that in the use of a steel having manganese, the maximum process of this invention in that a steel with greater manganese content resulted in a problem of "shelving". Shelving is a problem which may be experienced in roll-forming wherein the steel will separate into laminate "shelves" due to the high shear and stress of forming. Shelving is undesirable since it results in material separation and greatly reduces a bumper bar's strength and reliability.

FIG. 4 discloses a schematic of the unique apparatus for forming the bumper bar 1 of this invention and thus illustrates the process in producing the bumper bar. In FIG. 4 reference numeral 20 designates the overall apparatus which starting from the left side of the figure discloses the steel roll holder 21 which rotatably supports the steel roll 22 which contains a flat steel strip S constructed of steel as disclosed above and which extends into the series of roller assemblies 23, 24, 25, 26, 27, 28, 29, 29A and 29B. These rollers have a shape that as the strip is passed therethrough the strip of steel is gradually formed into the form as disclosed in FIG. 3. Although I have disclosed nine such roller assemblies for illustration purposes only, the number can be substantially increased and for some shapes may actually be decreased. Near the end of the apparatus 20 is the induction welder 30 of any well known type that will weld the two edges 31 and 32 together after such edges are caused to abut each other as disclosed in FIG. 9. In welding the abutting edges the induction welder 30 generates substantial local heat in the area of the tube near the weld which assists in the sweeping of the tube as will now be described.

A unique means is provided downstream of the induction welder 30 for producing the sweep (sweeping) of the bumper bar 1 as disclosed in FIG. 2. This sweep producing or sweeping means disclosed in FIGS. 4, 10 and 11, comprises a sweeping box 33 which includes a series of pairs of internal and external mandrels (34a and 35a, 34b and 35b, etc.) between which the tube formed by the rollers 23–29b and induction welder 30 pass. These mandrels have rounded ends as disclosed to assist in guiding the tube 1 between them. Each external mandrel is held by a mandrel frame 37 (FIG. 11) which is anchored at a horizontal centerpoint by a stabilizer 37. The sweep of the tube may be increased by vertical adjustments of the sweep adjusters 38a, 38b, 38c, etc. For example, as sweep adjuster 38a is adjusted upward, stabilizer 37a is also raised, thus forcing mandrel frame 36a and external mandrel 35a upward. Obviously, internal mandrel 34a is forced to follow this movement since the cross-sectional shape of the internal mandrels 34 are substantially identical to the cross section of the bumper 1. Therefore, as the roller formed tube passes thereover, it assumes the curvature or sweep of the mandrels.

The internal mandrels are supported by a support assembly 40 (FIG. 6) which includes two rods 41 and 42 extending from and secured to the support 43. The location of support 43 is selected to a position where the support 43 can extend downwardly into the tube as illustrated by FIG. 6. At this position, the steel strip has been rolled to form the front side 2 and the two top and bottom sides 4 and 5 and wherein the back side has not yet been formed leaving an opening 14 through which the support 43 extends.

It should be understood as the steel strip continues to pass through the rollers 27, 28 and 29 downstream of the support 40, it is progressively formed by the rollers 27, 28 and 29 to the shape as disclosed in FIG. 8. FIG. 9 discloses the shape of the tube roller formed to the desired shape with the edges 31 and 32 abutting. As the tube thus formed passes through the induction welder 30, the edges 31 and 32 are welded together. The tube then continues through rollers 29a and 29b which push against an internal mandrel 29c (FIGS. 9 and 12) which is similar in shape to the inside cross section of bumper bar 1 (FIG. 9). This allows rollers 29a and 29b to generate sufficient force to force bumper bar 1 forward across the sweeping box 33 without crushing or deforming the cross section of bumper bar 1.

As previously referred to, the indentation in the front side 2 of the bumper bar 1 is provided for two reasons. It gives additional strength to the bumper 1 and also provides a means for moving the bumper tube over the mandrels 34, 35 and 36. As illustrated in FIG. 9, the indentation 6 includes the ledges 7 and 8 which are engaged by the projecting sides 45 and 46 extending radially outwardly from roller 29b. Also, indentation 10 includes ledges 11 and 12 engaged by projecting sides 47 and 48 extending radially outwardly from rollers 29b. This engagement between the edges formed by ledge 7 and side 45, ledge 8 and side 46, ledge 11 and side 47 and ledge 12 and side 48 of the roller assembly 29b, and any of the other roller assemblies upstream thereof wherein the indentations 6 and 10 have already been formed, drives or advances the bumper bar 1 over the mandrels 34 and 35 in sweep box 33. This driving force also is created by roller 29a.

As disclosed in FIG. 4 a cutoff apparatus 50 is disclosed downstream of the mandrels 34 and 35 for cutting off the bumper bar 1 at its proper length. The bumper bar 1 that has thus been cut off is ready for further operations such as providing an attachment means for attaching the bumper bar 1 to the vehicle.

Operation

Having described the apparatus 20 and the bumper bar 1 that is formed thereby, the operation of the apparatus 20 and the uniqueness of the bumper bar 1 is evident. The steel strip S payed off from the roll 22 passes through the roll assemblies to form the tube as disclosed in FIG. 9 with the edges 31 and 32 of the steel strip abutting each other. The induction welder 30 forms the welded seam 13 to form a unitary integral tube 13 as disclosed in FIG. 10, the tube thus formed being straight.

It is within the contemplation of the broader aspects of this invention that the tube thus formed can be utilized as a straight bumper bar having substantial improved characteristics. It has a substantially higher level of strength and damage resistance so as to meet consumer expectation and government regulation concerning low speed vehicular impact. It has also low weight to minimize vehicular dead weight and low manufacturing costs. The high strength-to-weight ratio and ease of manufacture contribute to the superiority of the present bumper. Such superiority is made possible by forming the bumper of a high-strength sheet steel, with lower than normal thickness, roll-formed as disclosed above.

In accordance with the preferred more narrow aspects of this invention, the tube formed by the roller assemblies 23–29 and welder 30 is curved or sweeped to produce a bumper having a sweep of from 0–60. The higher the sweep, the stronger the bumper and the more spring back of the bumper. Such curvature or sweep is produced by passing the tube from the induction welder over the curved mandrel pairs 34 and 35, it being understood that one or more mandrels can be used. The tube is passed over the mandrels immediately after the weld seam 13 is produced by the induction welder 30. Thus, the steel is still in a locally heated condition which assists in the ease of curving or sweeping the tube without adversely affecting the structure. After the sweep is formed, the bumper bar 1 is cut off by the cut off apparatus 50 (FIG. 4).

The sweeping of the tube after it leaves the welder 30 is made possible by the unique support assembly 40 (FIGS. 6 and 7) located upstream of several of the roller assemblies so that the support 43 can extend through the opening 14 and into the tube so as to support the mandrels downstream by means of the rods 41 and 42.

The driving of bumper bar 1 through the sweeping box 33 as is made possible by the rollers 29a and 29b an indentations 6 and 10, the configurations of which generate sufficient force to force bumper bar 1 through sweeping box 33.

Modification

The present roll-formed bumper as described above makes possible a novel means for supporting the bumper on the vehicle. FIGS. 13 and 14 disclose such means which includes the ends of the bumper 1 being crushed and deformed to provide a flat surface 51 to which securement means such as bolt 52 (FIG. 13) can be attached for mounting the bumper bar 1 to a flat surface on a support such as a bracket 53 extending from the vehicle.

More specifically, as disclosed in FIGS. 13, 14 and 15, flat surface 51 and its orientation with respect to support bracket 53 is provided by the crushed or deformed outer ends of the bumper. As best disclosed in FIG. 15, rear side 3 is inclined to front side 2 thereby causing the collapsed portions 4a and 5a of sides 4 and 5. Collapsed side portions 4a and 5a provide the inclined flat surface 51 with a predetermined orientation allowing the surface 51 located on the plane P-P (FIG. 14) to mateably butt against a bracket 53 extending from the vehicle. A hole is provided at each end (only one end is shown). Hole 54 extends through the front side 2, rear side 3 and surface 51 and receives attachment bolt 52. The deformed end of bumper 1 and bolt 52 thereby form a structure for attachment of bumper bar 1 to a part of the vehicle such as bracket 53.

Although I have disclosed a preferred embodiment of this invention, it should be understood that many variations could be made without departing from the spirit and scope of the novel concepts of this invention.

The embodiments of the invention in which an exclusive property or privilege is claimed are defined as follows:

1. A bumper bar for a vehicle comprising:
    a formed sheet of high tensile strength steel of at least 60 KSI and less than 0.100 inch thickness; said formed sheet having side edges and roll-formed to cause the side edges to abut one another;
    said side edges being welded together to form an integral tube having ends and having a front wall and a rear wall connected together by side walls from end to end; and
    said ends each comprising an end portion of said side walls which are deformed along with an end portion of said rear wall, said end portion of said rear wall being deformed to provide a substantially flat surface for attachment to said vehicle.

* * * * *

UNITED STATES PATENT AND TRADEMARK OFFICE
CERTIFICATE OF CORRECTION

PATENT NO. : 5,306,058
DATED : April 26, 1994
INVENTOR(S) : Peter Sturrus et al.

It is certified that error appears in the above-indentified patent and that said Letters Patent is hereby corrected as shown below:

Column 1, line 34:
 "o" should be --or--.

Column 4, line 25:
 "100 inches" should be --.100 inches--.

Column 4, line 51:
 "o" should be --or--.

Column 5, line 25:
 After "maximum" insert --manganese content of 1.2 percent (1.2%) is preferred in the--.

Signed and Sealed this

Eighteenth Day of October, 1994

Attest:

BRUCE LEHMAN

*Attesting Officer*   *Commissioner of Patents and Trademarks*